United States Patent
Foo et al.

(10) Patent No.: US 7,182,258 B2
(45) Date of Patent: Feb. 27, 2007

(54) ENHANCED REFLECTIVE OPTICAL ENCODER

(75) Inventors: Siang Leong Foo, Penang (MY); Weng Fei Wong, Kedah (MY); Yee Loong Chin, Perak (MY)

(73) Assignee: Avago Technologies ECBU IP (Singapore) Pte. Ltd, Singapore (SG)

( * ) Notice: Subject to any disclaimer, the term of this patent is extended or adjusted under 35 U.S.C. 154(b) by 240 days.

(21) Appl. No.: 10/985,701

(22) Filed: Nov. 10, 2004

(65) Prior Publication Data
US 2006/0097051 A1    May 11, 2006

(51) Int. Cl.
G06K 7/10      (2006.01)
G01D 5/34      (2006.01)

(52) U.S. Cl. ............ 235/454; 250/231.13; 250/231.14; 235/462.01

(58) Field of Classification Search ................ 235/454, 235/462.01–462.49; 250/231.13, 231.14, 250/231.18
See application file for complete search history.

(56) References Cited

U.S. PATENT DOCUMENTS

| | | | |
|---|---|---|---|
| 5,350,909 A | * | 9/1994 | Powell et al. .......... 235/462.32 |
| 6,768,101 B1 | * | 7/2004 | Lee et al. .............. 250/231.13 |
| 2004/0061044 A1 | * | 4/2004 | Soar ..................... 250/231.13 |

* cited by examiner

Primary Examiner—Michael G. Lee
Assistant Examiner—Daniel A. Hess

(57) ABSTRACT

An Enhanced Reflective Optical Encoder ("EROE") having an emitter module for transmitting emitted optical radiation to an encoded media and a detector module for receiving reflected optical radiation from the encoded media. The EROE may include a transmissive layer covering both the emitter module and the detector module, and an optical isolation element located within the transmissive layer and located between the emitter module and the detector module. The optical isolation element reduces undesired optical radiation transmitted from the emitter module to the detector module, where the undesired optical radiation is a portion of the emitted optical radiation.

20 Claims, 15 Drawing Sheets

ENHANCED REFLECTIVE OPTICAL ENCODER

BACKGROUND OF THE INVENTION

Sensors are key feedback devices on many electromechanical systems. There is a wide variety of sensors available and new sensor technologies are continuously being developed. One of the most common position sensors utilized to measure the moving parts within a mechanical system is the optical encoder. An optical encoder is a closed-feedback device that converts motion or positional information into digital signals that may be utilized by a motor control system.

Optical encoders produce a digital output based on an encoded media (such as a codewheel or codestrip) that passes either through or by the optical encoder. In general, this encoded media is encoded with alternating light and dark regions (or slots) on the surface of the encoded media. When operated in conjunction with this encoded media, the optical encoder translates rotary or linear motion into a two-channel digital output.

Typically, optical encoders are either linear optical encoders or rotational optical encoders. Linear optical encoders may determine the velocity, acceleration and position of a read-head relative to an encoded media (such as a linear codestrip) utilizing a linear scale, while rotational optical encoders may determine the tangential velocity, acceleration and angular position of a read-head relative to an encoded media (such as a codewheel) utilizing a circular scale. Generally, both linear and rotational optical encoders may be implemented either as transmissive, reflective or imaging optical encoders.

In FIG. 1, a side cross-sectional view of a typical transmissive optical encoder 100 in combination with an encoded media (such as codestrip or codewheel) 102 is shown. The optical encoder 100 may include a read-head 104, where the read-head 104 may include an emitter module 106, and a detector module 108. The read-head 104 and the encoded media 102 may move freely relative to each other in either a linear or rotational manner based on whether the transmissive optical encoder 100 is either a linear or rotational optical encoder.

The emitter module 106 and the detector module 108 may include optics capable of emitting and detecting, respectively, optical radiation 110 from the emitter module 106 to the detector module 108. The optical radiation 110 may be visible, infrared, and/or ultraviolet light radiation. The emitting module 106 may include a light source (not shown) such as a diode, a light emitting diode ("LED"), photo-cathode, and/or a light bulb, and the detector module 108 may include an array of photo-detectors (not shown) such as photo-diodes, photo-cathodes, and/or photo-multipliers.

In FIG. 2, a side cross-sectional view of a typical reflective optical encoder 200 in combination with an encoded media 202 is shown. The reflective optical encoder 200 may include a read-head 204, where the read-head 204 may include an emitter module 206, and a detector module 208. Similar to FIG. 1, the read-head 204 and the encoded media 202 may move freely relative to each other in either a linear or rotational manner based on whether the reflective optical encoder 200 is either a linear or rotational optical encoder.

The emitter module 206 and the detector module 208 may include optics capable of emitting and detecting, respectively, optical radiation from the emitter module 206 to the detector module 208. The optical radiation may include emitted optical radiation 210, which is emitted by the emitter module 206 on to the encoded media 202, and reflected optical radiation 212, which is reflected to the detector module 208 by the encoded media 202.

It is appreciated by those skilled in the art that the optical radiation again may be visible, infrared, and/or ultraviolet light radiation. The emitting module 206 may include a light source (not shown) such as a diode, a LED, photo-cathode, and/or a light bulb, and the detector module 208 may include an array of photo-detectors (not shown) such as photo-diodes, photo-cathodes, and/or photo-multipliers.

Similarly, in FIG. 3, a side cross-sectional view of a typical imaging optical encoder 300 in combination with an encoded media 302 is shown. The imaging optical encoder 300 may include a read-head 304, where the read-head 304 may include an emitter module 306, and a detector module 308. Similar to both FIGS. 1 and 2, the read-head 304 and the encoded media 302 may move freely relative to each other in either a linear or rotational manner based on whether the reflective optical encoder 300 is either a linear or rotational optical encoder.

The emitter module 306 and the detector module 308 may include optics capable of emitting and detecting, respectively, optical radiation from the emitter module 306 to the detector module 308. The optical radiation may include emitted optical radiation 310, which is emitted by the emitter module 306 on to the encoded media 302, and reflected optical radiation 312, which is reflected to the detector module 308 by the encoded media 302.

It is appreciated by those skilled in the art that the optical radiation again may be visible, infrared, and/or ultraviolet light radiation. The emitting module 306 may include a light source (not shown) such as a diode, a LED, photo-cathode, and/or a light bulb, and the detector module 308 may include an array of photo-detectors (not shown) such as photo-diodes, photo-cathodes, and/or photo-multipliers.

In FIG. 4, a top-view of a typical transmissive or reflective linear encoded media 400 utilized as a codestrip by a linear optical encoder (not shown) is shown. The encoded media 400, FIG. 4, may include an alternating pattern of light regions (i.e., light bars 402) and dark regions (i.e., dark bars 404). Utilizing the encoded media 400, the linear optical encoder may determine the velocity and acceleration of the read-head (not shown) relative to the encoded media 400.

Similarly, in FIG. 5, a top-view of a typical transmissive or reflective rotational encoded media 500 utilized as a codewheel on a wheel shaft 502 by a rotational optical encoder (not shown) is shown. The encoded media 500, FIG. 5, may include an alternating pattern of light regions (i.e., light bars 504) and dark regions (i.e., dark bars 506). Utilizing the encoded media 500, the rotational optical encoder may determine the rotational velocity and acceleration of the read-head (not shown) relative to the encoded media 500.

The light and dark regions in both FIGS. 4 and 5 may contain opaque and transparent segments, respectively, that interrupt the optical radiation from the emitter module to the detector module in the optical detector. In the case of a transmissive optical encoder, the optical radiation directly transmitted from the emitter module to the detector module is interrupted by the encoded media; while in the case of the reflective or imaging optical encoder, the optical radiation from the emitter module is either reflected to the detector module by the encoded media or transmitted through the encoded media away from the detector module.

The optical encoder output is then either a binary "ON" or "OFF," depending on whether the optical encoder is over a light or dark region on the encoded media in the transmissive optical encoder or whether the optical radiation is reflected on to the detector module. The electronic signals generated by the optical encoder are then passed to a controller that is capable of determining the position and velocity of the optical detector based upon the received signals.

In general, transmissive optical encoders are capable of operating at high speed and high resolution because of their good contrast capabilities. Unfortunately, however, transmissive optical encoders require packaging designs with high profiles because the emitter module and detector module need to be placed opposite each other around the encoder media.

Reflective optical encoders have better packaging designs than transmissive optical encoders because the emitter module and detector module are located substantially on the same plane and may be integrated into a single semiconductor substrate in an integrated circuit. This results in lower profile packaging design with less materials and less assembly complexity than transmissive optical encoders. Unfortunately, typical reflective optical encoders suffer from lower contrast capabilities than transmissive optical encoders and therefore have limits in speed and resolution compared to transmissive optical encoders.

Imaging optical encoders typically have the same benefits as reflective optical encoders in terms of profile, materials and assembly complexity. However, imaging optical encoders require a diffusive encoded media that at present is not maturely established technologically. Additionally, imaging optical encoders suffer from diffusive reflectance and also have limits in speed and resolution compared to transmissive optical encoders.

In FIG. 6, another side cross-sectional view of a typical reflective optical encoder 600 in combination with an encoded media 602 is shown. The reflective optical encoder 600 may include a read-head 604, where the read-head 604 may include an emitter module 606, and a detector module 608. Similar to FIGS. 1, 2, and 3, the read-head 604 and the encoded media 602 may move freely relative to each other in either a linear or rotational manner based on whether the reflective optical encoder 600 is either a linear or rotational optical encoder.

The emitter module 606 and the detector module 608 may include optics capable of emitting and detecting, respectively, optical radiation from the emitter module 606 to the detector module 608. The optical radiation may include emitted optical radiation 610, which is emitted by the emitter module 606 on to the encoded media 602, and reflected optical radiation 612, which is reflected to the detector module 608 by the encoded media 602. Additionally, both emitter module 606 and detector module 608 may be mounted on a common substrate 614. The substrate may be a single semiconductor substrate in an integrated circuit, a lead-frame, an insert-molded lead-frame, a printed circuit board ("PCB"), flexible circuit, ceramics substrate or micro-interconnecting device ("MID").

It is appreciated that the optical radiation again may be visible, infrared, and/or ultraviolet light radiation. The emitting module 606 may include a light source (not shown) such as a diode, a LED, photo-cathode, and/or a light bulb, and the detector module 608 may include an array of photo-detectors (not shown) such as photo-diodes, photo-cathodes, and/or photo-multipliers.

The optics may include a transmissive layer 616 capable of covering both the emitter module 606 and detector module 608, where the transmissive layer 616 may include any transmissive and moldable material capable of collimating the emitted optical radiation 610 into a parallel beam of optical radiation directed from the emitter module 606 to the encoded media 602. The transmissive layer 616 may be an epoxy layer.

Unfortunately, a problem with this type of reflective optical encoder 600 is that undesired optical radiation 618 from the emitter module 606 is propagated through the epoxy to the detector module 608 causing noise in the detector module 608 that results in loss of image contrast of the light and dark regions (i.e., the "bars") on the encoded media 602. This loss in image contrast limits the speed and resolution of the typically known reflective optical encoder 600. Therefore, there is a need for an improved reflective optical encoder that is capable of providing higher image contrast and resolution than known reflective optical encoders

SUMMARY

An Enhanced Reflective Optical Encoder ("EROE") having an emitter module for transmitting emitted optical radiation to an encoded media and a detector module for receiving reflected optical radiation from the encoded media is disclosed. The EROE may include a transmissive layer covering both the emitter module and the detector module. The EROE may include an optical isolation element located within the transmissive layer and located between the emitter module and the detector module. The optical isolation element reduces undesired optical radiation transmitted from the emitter module to the detector module, where the undesired optical radiation is a portion of the emitted optical radiation.

Alternatively, the EROE may include an optical isolation element located on top of the transmissive layer and located between the emitter module and the detector module. The optical isolation element reduces undesired optical radiation transmitted from the emitter module to the detector module, where the undesired optical radiation is a portion of the emitted optical radiation.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, reference is made to the accompanying drawings that form a part hereof, and which show, by way of illustration, a specific embodiment in which the invention may be practiced. Other example of implementation may be utilized and structural changes may be made without departing from the scope of the present invention.

Figure 7:
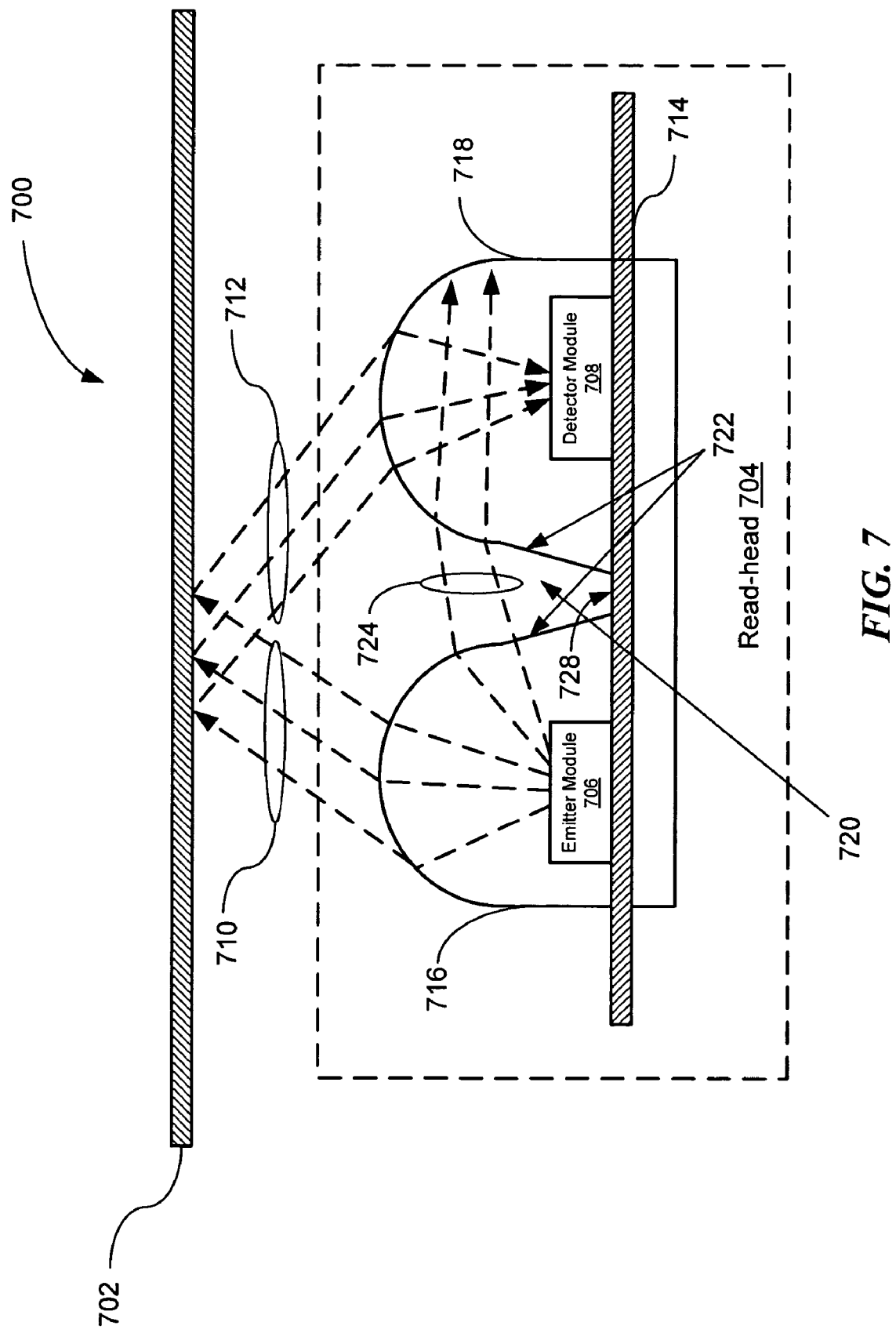
FIG. 7 shows a side cross-sectional view of an example of an implementation of an Enhanced Reflective Optical Encoder ("EROE") in combination with an encoded media, where the EROE includes a transmissive layer trench.
Figure 8:
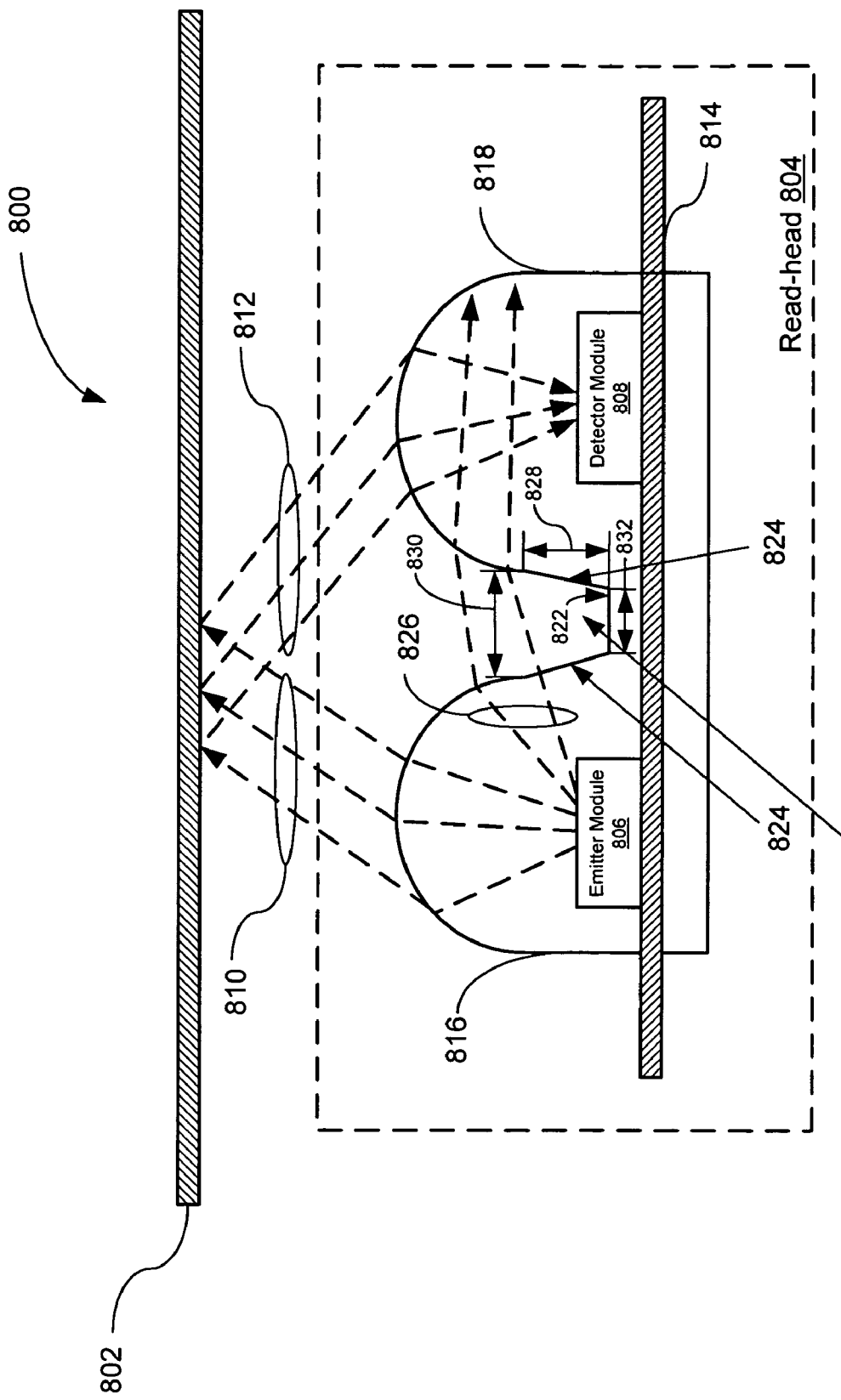
FIG. 8 shows a side cross-sectional view of another example of an implementation of an Enhanced Reflective Optical Encoder ("EROE") in combination with an encoded media, where the EROE includes a transmissive layer trench.
Figure 9:
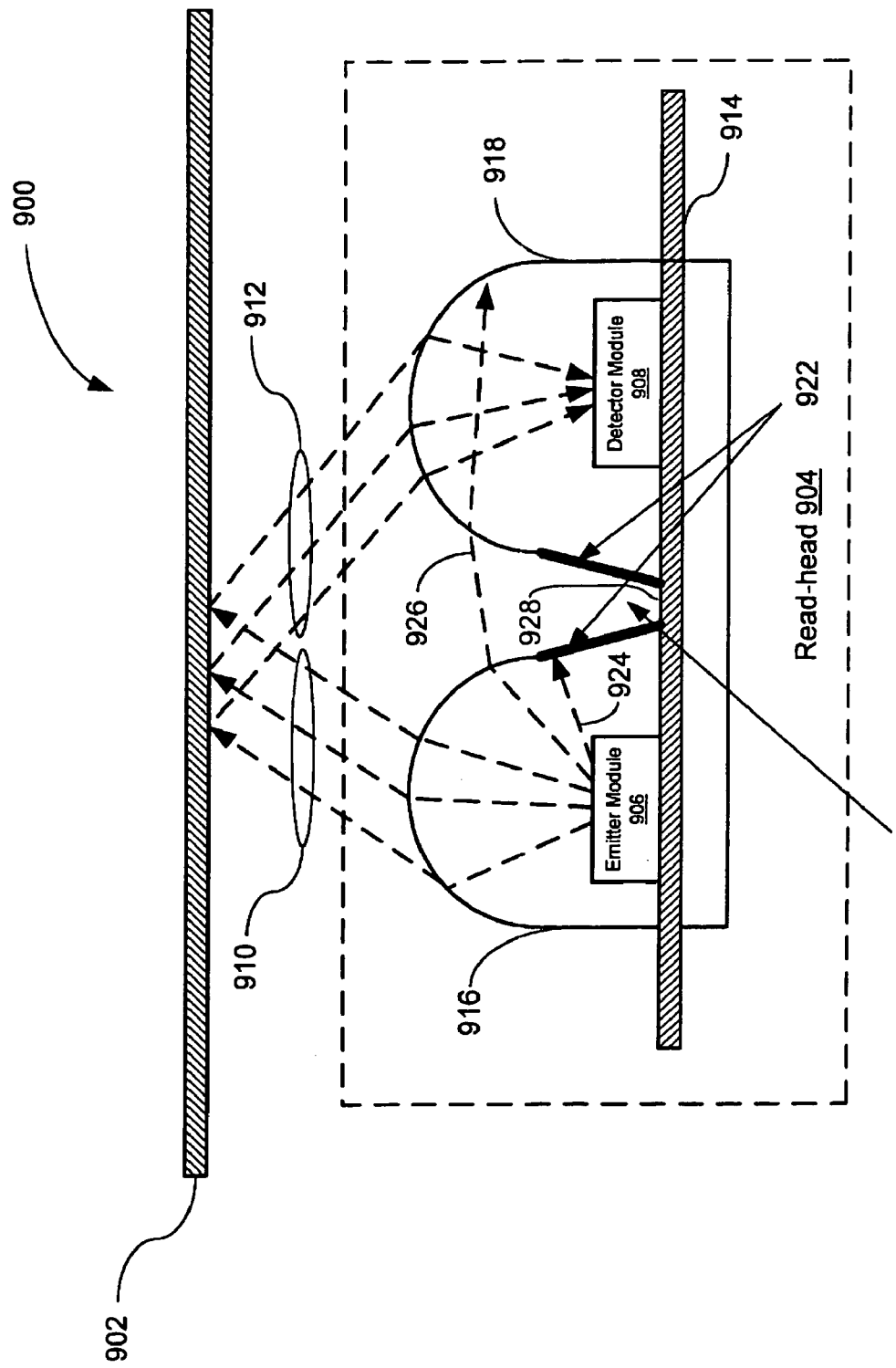
FIG. 9 shows a side cross-sectional view of another example of an implementation of an EROE in combination with an encoded media.
Figure 11:
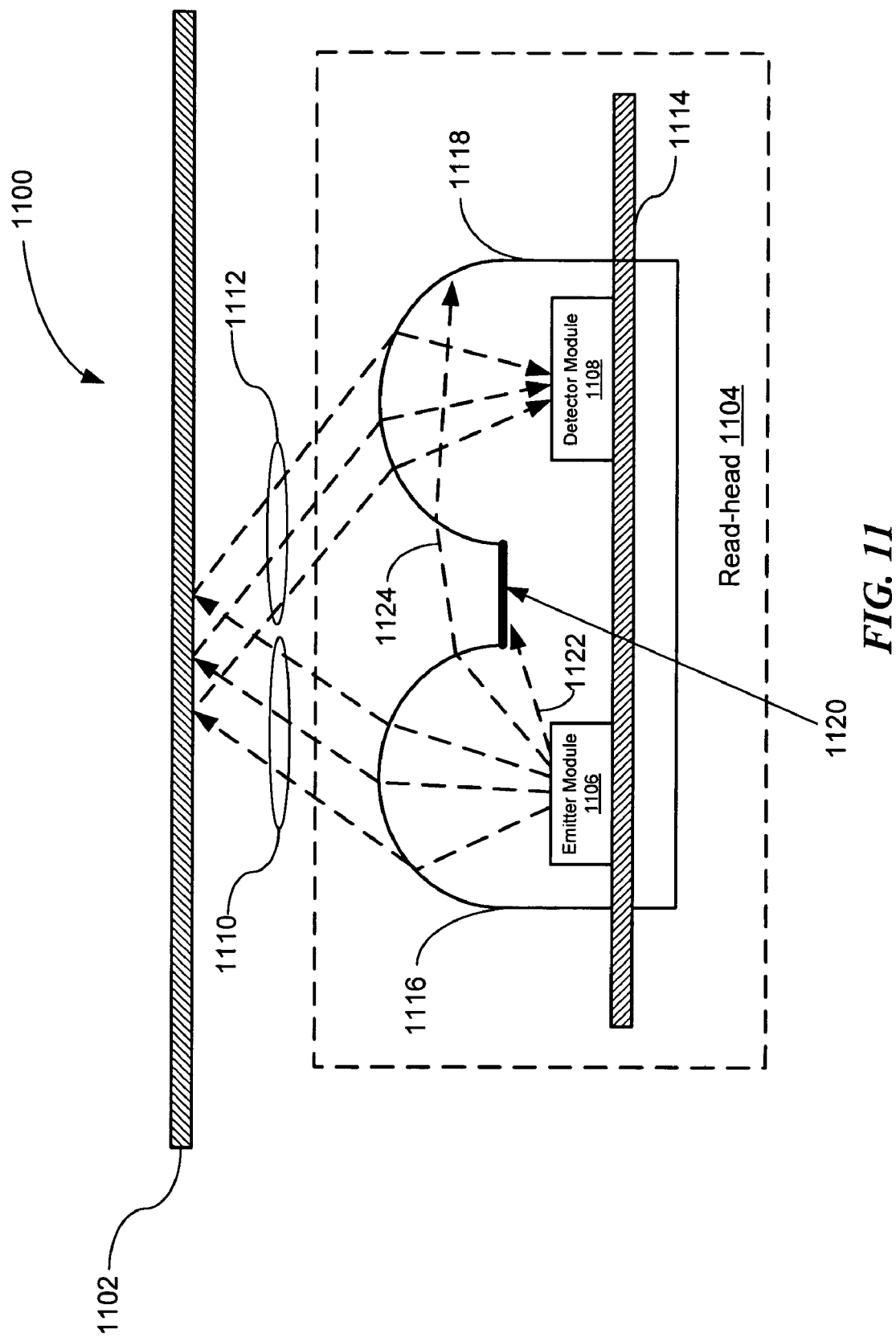
FIG. 11 shows a side cross-sectional view of yet another example of an implementation of an EROE in combination with an encoded media.
Figure 12:
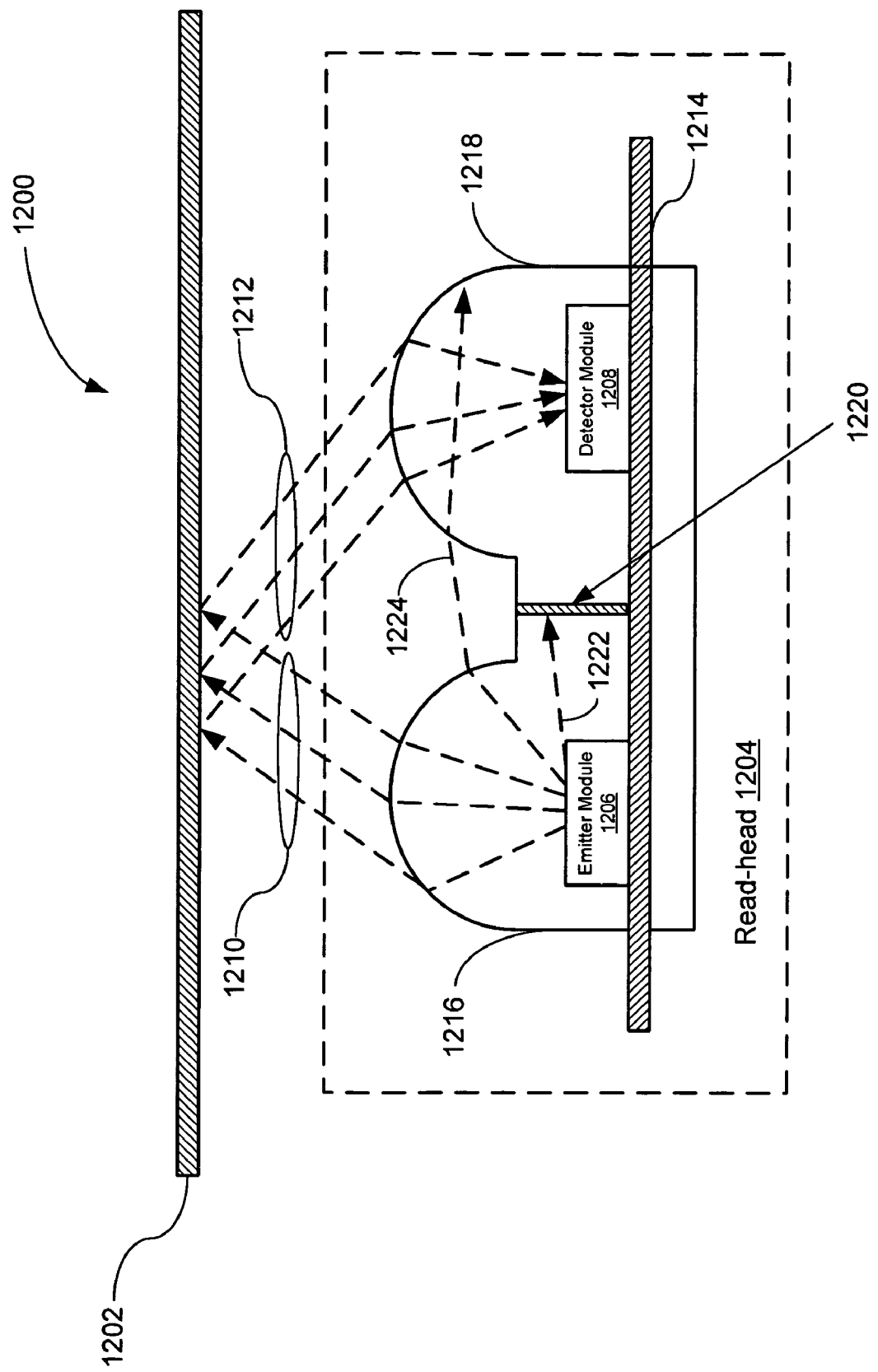
FIG. 12 shows a side cross-sectional view of another example of an implementation of an EROE in combination with an encoded media.
Figure 13:
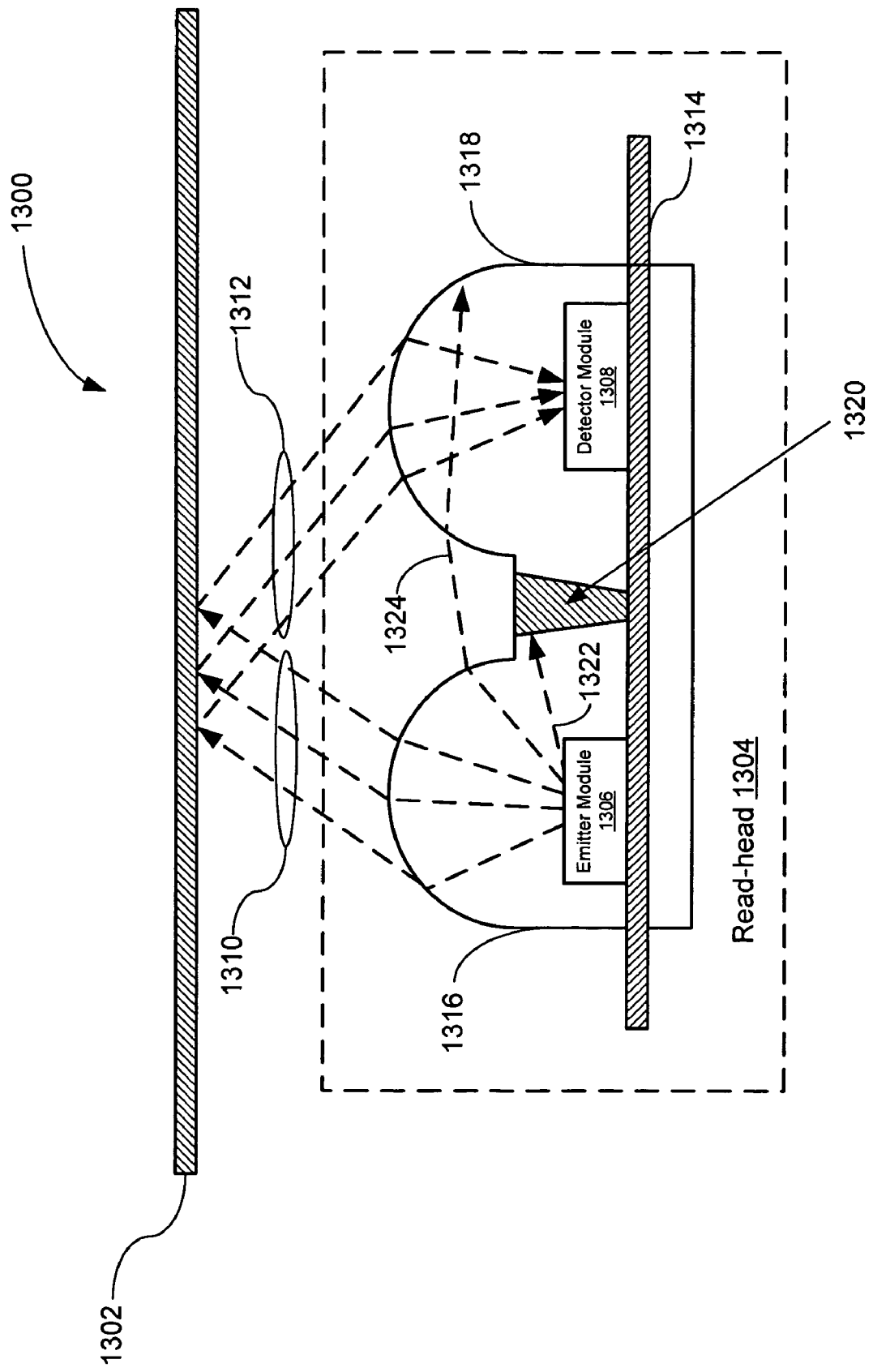
FIG. 13 shows a side cross-sectional view of still another example of an implementation of an EROE in combination with an encoded media.
Figure 14:
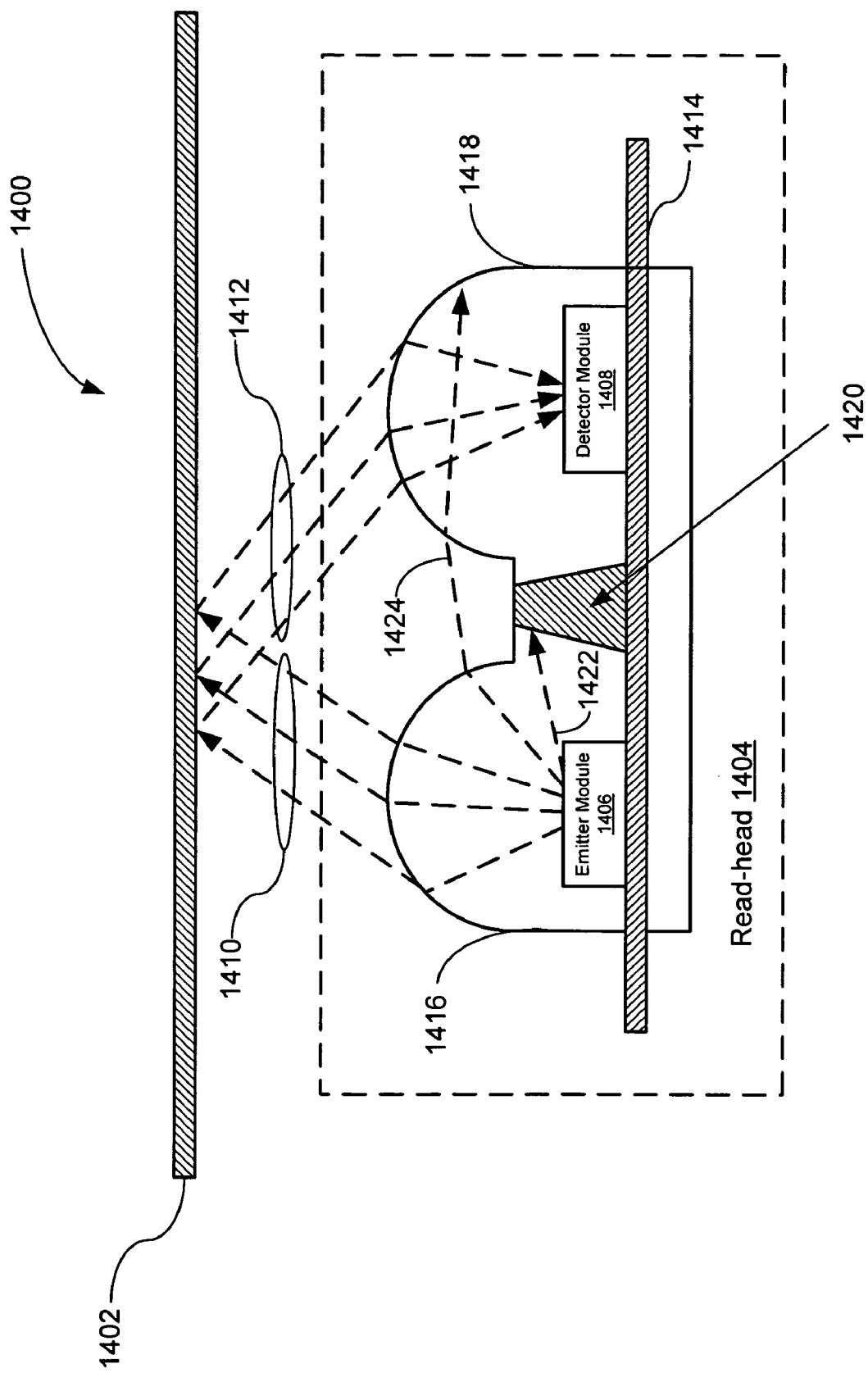
FIG. 14 shows a side cross-sectional view of yet another example of an implementation of an EROE in combination with an encoded media.

As stated above, a problem with known types of reflective optical encoders is that undesired optical radiation from the emitter module is propagated through the epoxy to the detector module causing noise in the detector module, which results in loss of image contrast of the light and dark regions (i.e., the "bars") on the encoded media. This loss in image contrast limits the speed and resolution of typical known reflective optical encoders. In response, an Enhanced Reflective Optical Encoder ("EROE") is described that is capable of providing higher image contrast and resolution than known reflective optical encoders. The EROE may use an optical isolation element located within the transmissive layer, where the optical isolation element may include a transmissive layer trench, as shown in FIGS. 7, 8 and 9, or a light baffle component, as shown in FIGS. 12, 13 and 14. The optical isolation element may also be a located on top of the transmissive layer, as shown in FIG. 11.

In FIG. 7, a side cross-sectional view of an example of an implementation of an EROE 700 in combination with an encoded media 702 is shown, where the optical isolation element is a transmissive layer trench 720 that may include a trench bottom 728 that is located on a substrate 714. The EROE 700 may include a read-head 704, where the read-head 704 may include an emitter module 706, and a detector module 708. Similar to FIGS. 1, 2, 3 and 6, the read-head 704 and the encoded media 702 may move freely relative to each other in either a linear or rotational manner based on whether the EROE 700 is either a linear or rotational optical encoder, respectively.

The emitter module 706 and the detector module 708 may include optics capable of emitting and detecting, respectively, optical radiation from the emitter module 706 to the detector module 708. The optical radiation may include emitted optical radiation 710, which is emitted by the emitter module 706 on to the encoded media 702, and reflected optical radiation 712, which is reflected to the detector module 708 by the encoded media 702. Additionally, both emitter module 706 and detector module 708 may be mounted on a common substrate 714. The common substrate 714 may be a single semiconductor substrate in an integrated circuit, a lead-frame, an insert-molded lead-frame, a printed circuit board ("PCB"), flexible circuit, ceramics substrate or micro-interconnecting device ("MID").

It is appreciated that the optical radiation may be visible, infrared, and/or ultraviolet light radiation. The emitting module 706 may include a light source (not shown) such as a diode, a LED, photo-cathode, and/or a light bulb, and the detector module 708 may include an array of photo-detectors (not shown) such as photo-diodes, photo-cathodes, and/or photo-multipliers.

The optics may include a transmissive layer having a first epoxy layer 716 capable of covering the emitter module 706 and a second epoxy layer 718 covering the detector module 708, where both the first epoxy layer 716 and second epoxy layer 718 may include any transmissive and moldable material capable of collimating the emitted optical radiation 710 into a parallel beam of optical radiation directed from the emitter module 706 to the encoded media 702, and concentrating the reflected optical radiation 712 into a beam of optical radiation directed at the detector module 708, respectively.

The transmissive layer may be used to bend the emitted optical radiation 710 as well as for packaging purposes. The color of the transmissive layer may be clear transparent if the emitter module 706 emits visible light. However, if the emitter module 706 transmits infrared radiation, the transmissive layer may be colored with black dye because the infrared radiation is capable of penetrating the black dye epoxy. Additionally, the transmissive layer includes any colored epoxy (such as red, yellow, etc).

Figure 1:
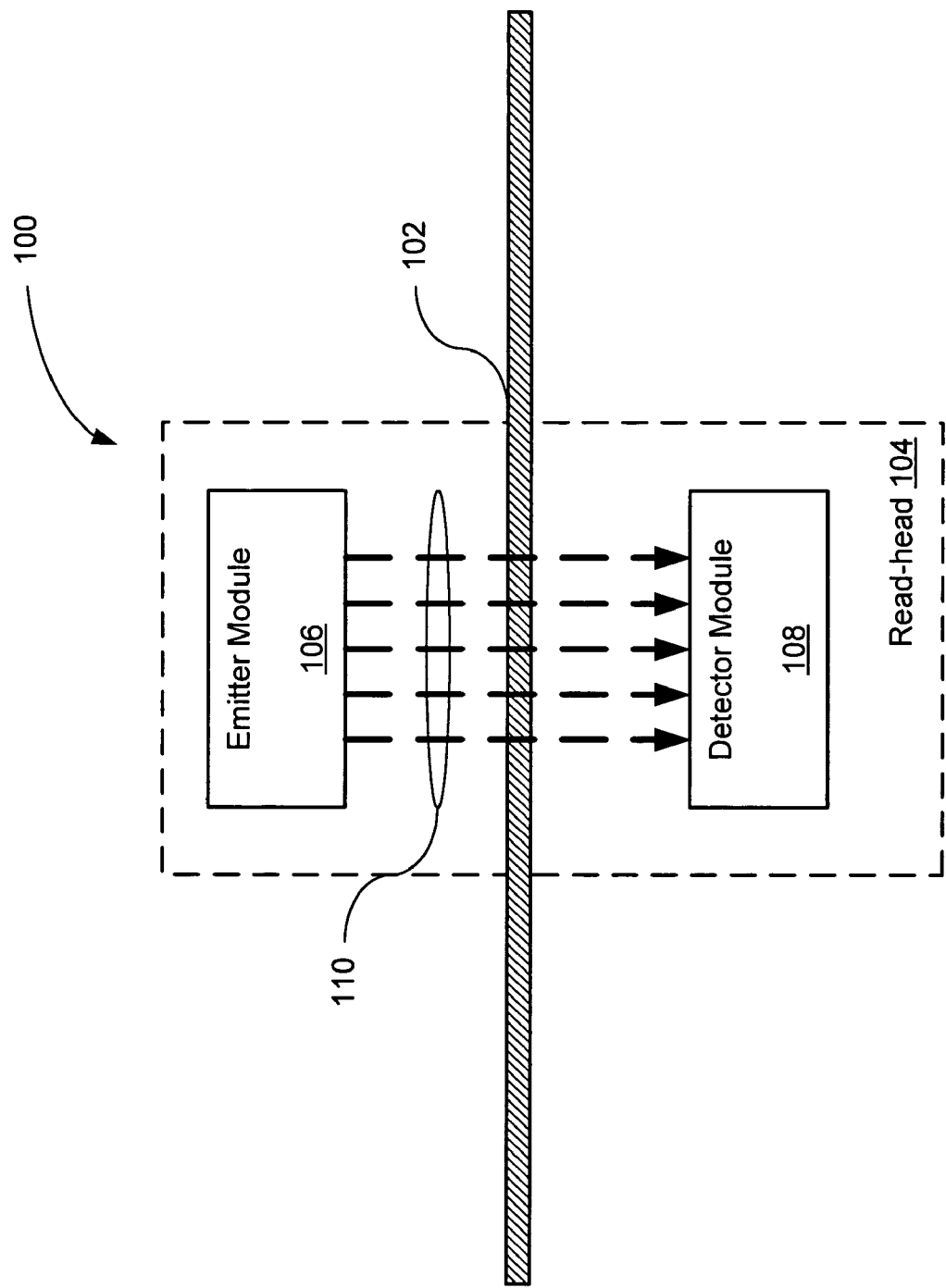
FIG. 1 shows a side cross-sectional view of a typical transmissive optical encoder in combination with an encoded media (such as codestrip or codewheel).
Figure 2:
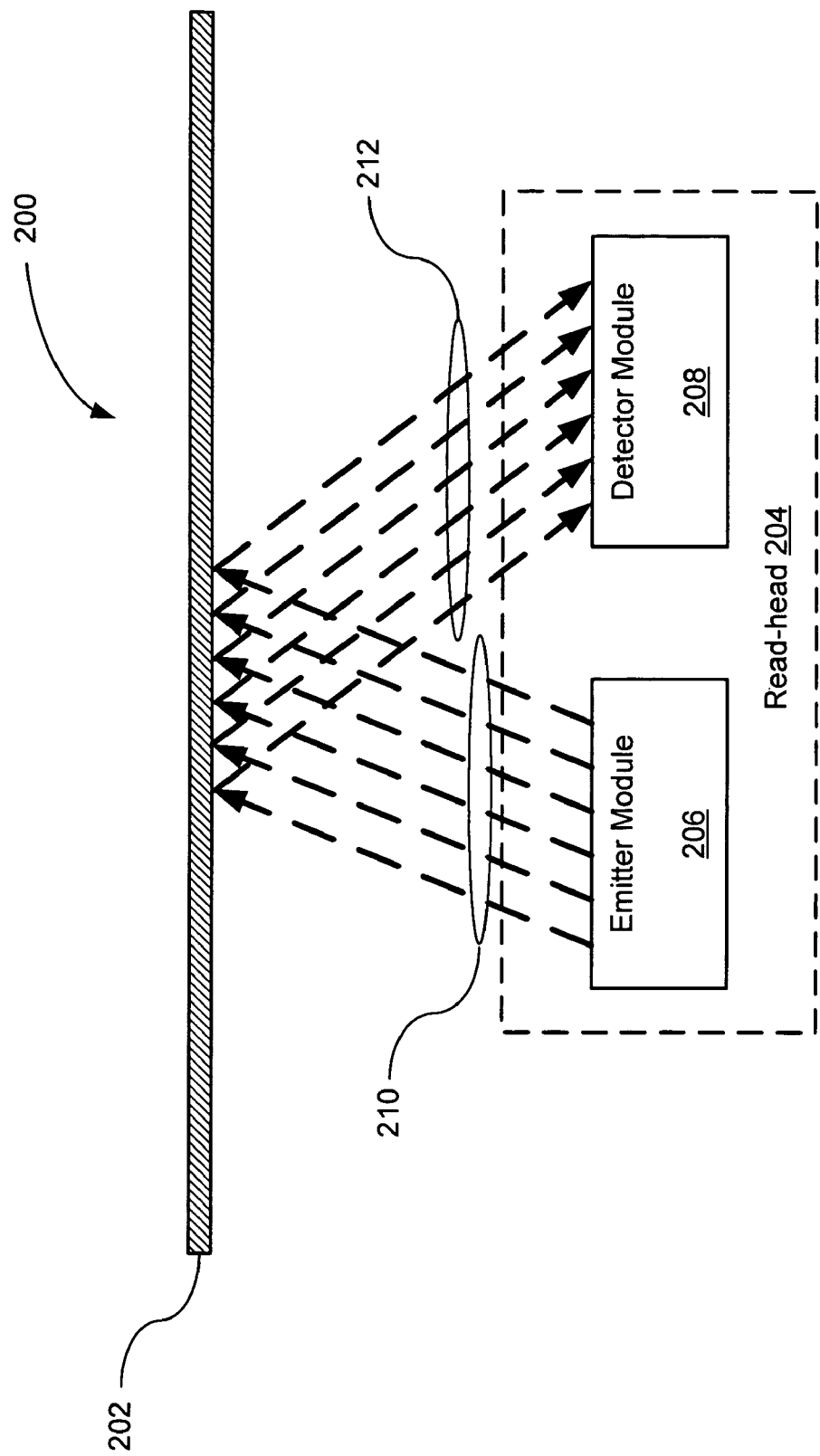
FIG. 2 shows a side cross-sectional view of a typical reflective optical encoder in combination with an encoded media.
Figure 3:
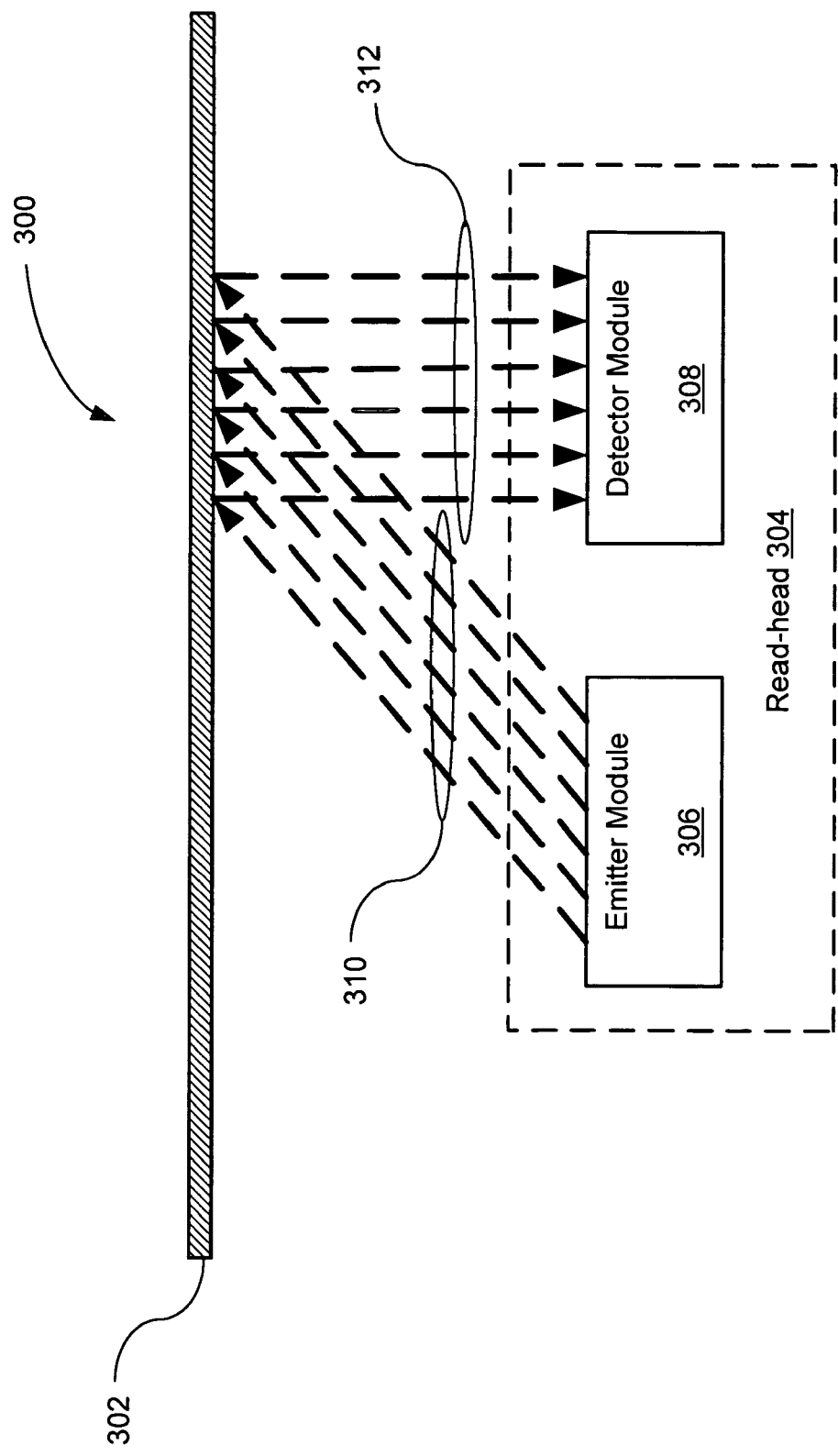
FIG. 3 shows a side cross-sectional view of a typical imaging optical encoder in combination with an encoded media.
Figure 4:
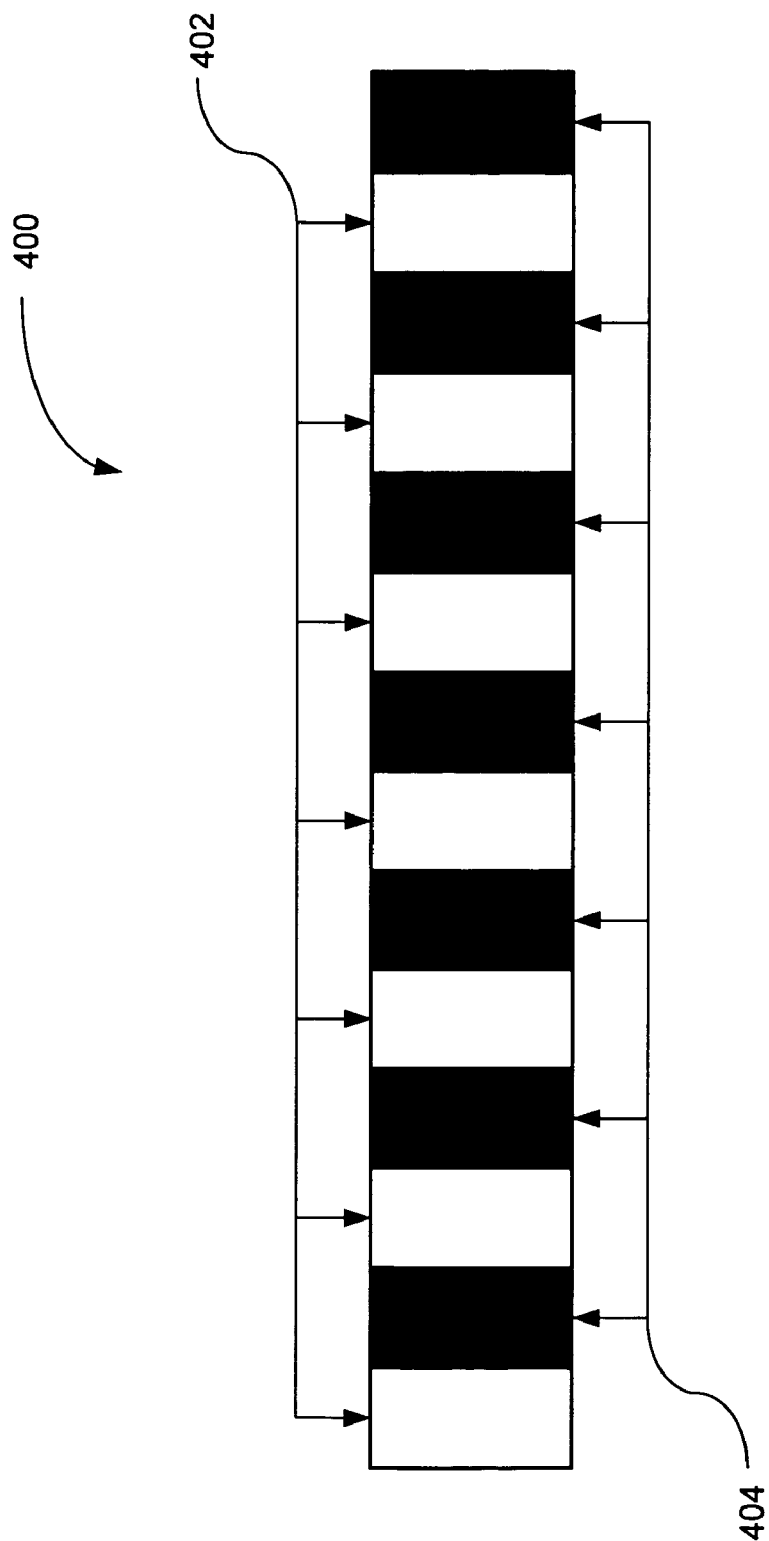
FIG. 4 shows a top-view of a typical transmissive or reflective linear encoded media utilized as a codestrip by a linear optical encoder (not shown).
Figure 5:
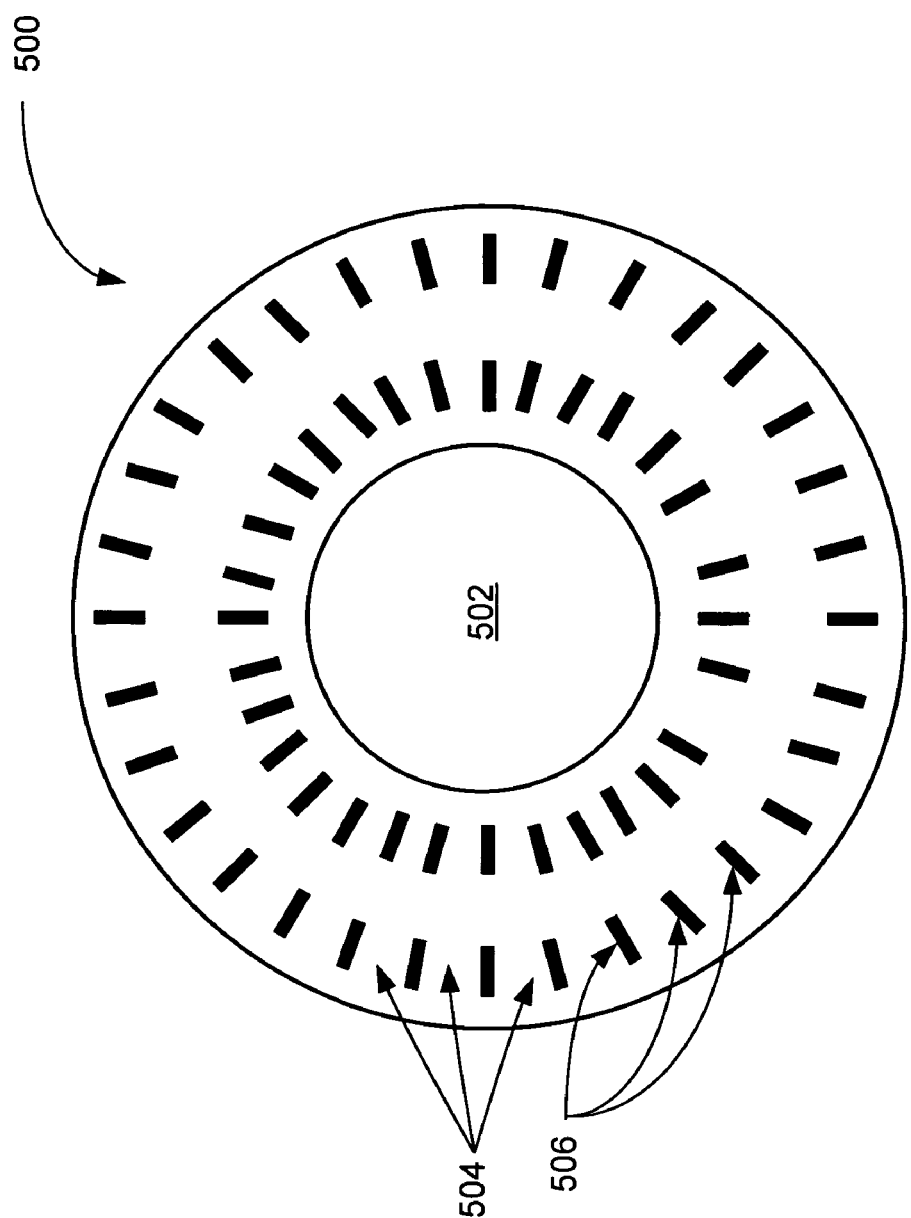
FIG. 5 shows a top-view of a typical transmissive or reflective rotational encoded media utilized as a codewheel on a wheel shaft by a rotational optical encoder (not shown).
Figure 6:
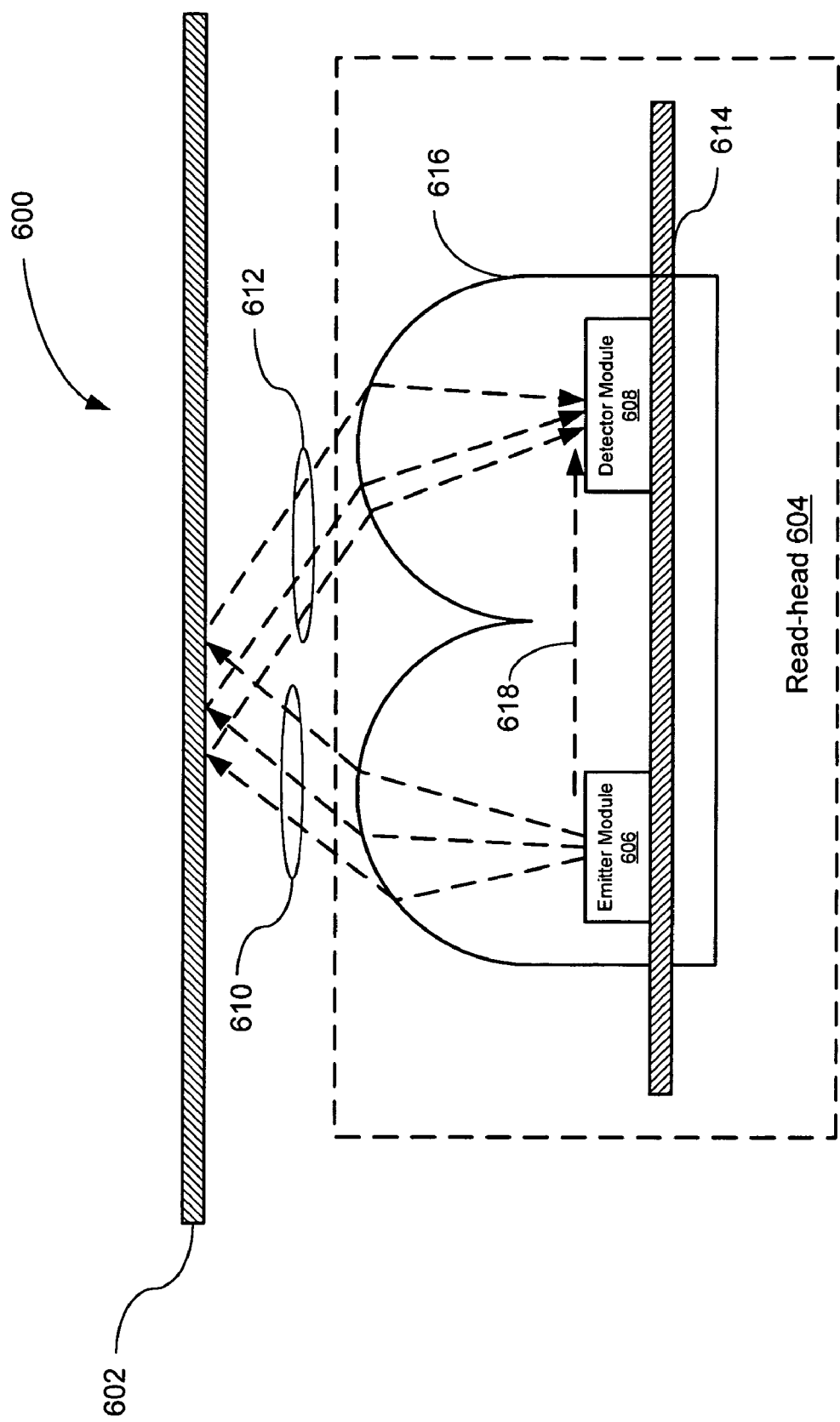
FIG. 6 shows another side cross-sectional view of a typical reflective optical encoder in combination with an encoded media.

Unlike the reflective optical encoder 600 shown in FIG. 6, the EROE 700 may include a transmissive layer trench 720 (such as an air-gap) between the first epoxy layer 716 and second epoxy layer 718. The transmissive layer trench 720 surfaces 722 may be tapered at an angle predetermined for ease of manufacturing. The transmissive layer trench 720 causes the undesired optical radiation 724 to refract away from the detector module 708 reducing the noise caused by the undesired optical radiation 724 on the detector module 708.

In FIG. 7, the transmissive layer trench 720 may extend optionally to the substrate 714; however, it is appreciated by those skilled in the art that the transmissive layer trench 720 alternatively may not extend to the substrate 714. As an example, in FIG. 7, the transmissive layer trench 720 may include a trench bottom 728 that is substantially located on the substrate 714. It is also appreciated by those skilled in the art that if the trench bottom 728 is substantially located on the substrate 714, then the first epoxy layer 716 and second epoxy layer 718 may not be joined at the trench bottom 728 but may be joined elsewhere (not shown).

In FIG. 8, a side cross-sectional view of another example of an implementation of an EROE 800 in combination with an encoded media 802 is shown, where the optical isolation element is a transmissive layer trench 804 that may include a trench bottom 806 that is not located on a substrate 808. Similar to FIG. 7, the EROE 800 may include a read-head 810, where the read-head 810 may include an emitter module 812, and a detector module 814. Similar to FIGS. 1, 2, 3, 6 and 7, the read-head 810 and the encoded media 802 may move freely relative to each other in either a linear or rotational manner based on whether the EROE 800 is either a linear or rotational optical encoder, respectively.

The emitter module 812 and the detector module 814 may include optics capable of emitting and detecting, respectively, optical radiation from the emitter module 812 to the detector module 814. The optical radiation may include emitted optical radiation 816, which is emitted by the emitter module 812 on to the encoded media 802, and reflected optical radiation 818, which is reflected to the detector module 814 by the encoded media 802. Additionally, both emitter module 812 and detector module 814 may be mounted on the common substrate 808. The common substrate 808 may be a single semiconductor substrate in an integrated circuit, a lead-frame, an insert-molded lead-frame, a PCB, flexible circuit, ceramics substrate or MID.

It is appreciated that the optical radiation may be visible, infrared, and/or ultraviolet light radiation. The emitting module 812 may include a light source (not shown) such as a diode, a LED, photo-cathode, and/or a light bulb, and the detector module 814 may include an array of photo-detectors (not shown) such as photo-diodes, photo-cathodes, and/or photo-multipliers.

The optics may include a transmissive layer having a first epoxy layer 820 capable of covering the emitter module 812 and a second epoxy layer 822 covering the detector module 814, where both the first epoxy layer 820 and second epoxy layer 822 may include any transmissive and moldable material capable of collimating the emitted optical radiation 816 into a parallel beam of optical radiation directed from the emitter module 812 to the encoded media 802, and concentrating the reflected optical radiation 818 into a beam of optical radiation directed at the detector module 814, respectively.

Similar to the EROE 700 shown in FIG. 7, the EROE 800 may include the transmissive layer trench (such as an air-gap) between the first epoxy layer 820 and second epoxy layer 822. The transmissive layer trench 804 surfaces 824 may be tapered at an angle predetermined for ease of manufacturing. The transmissive layer trench 804 causes the undesired optical radiation 826 to refract away from the detector module 814 reducing the noise caused by the undesired optical radiation 826 on the detector module 814. In FIG. 8, the trench bottom 806 does not extend to the common substrate 808.

It is appreciated by those skilled in the art that the depth 828 of the transmissive layer trench 804 may be determined by the emitter module 812 and lens configuration through the first epoxy layer 820, and the detector module 814 and lens configuration through the second epoxy layer 822. In general, the performance improves as the depth 828 increases until most of the undesired optical radiation 826 is blocked by the transmissive layer trench 804. Additionally, the transmissive layer trench 804 may be designed to have a trench upper width 830 and trench lower width 832 that are optically working to prevent the undesired optical radiation leakage from the emitter module 812 to the detector module 814.

As an example, the trench upper width 830 may be 0.5 millimeters ("mm"), the trench lower width 832 may be 0.3 mm, and the trench depth 828 may be 0.3 mm. However, the trench upper width 830, the trench lower width 832, and trench depth 828 are usually determined by the size of lens created by the epoxy layers 820 and 822, emitter light emitting area (not shown) on the emitter module 812, position between the emitter module 812 and detector module 814, detector surface area (not shown) to lens profile created by the epoxy layer 820 and/or 822.

In FIG. 9, a side cross-sectional view of another example of an implementation of an EROE 900 in combination with an encoded media 902 is shown, where the optical isolation element is a transmissive layer trench 920 that may include a trench bottom 928 that is located on a substrate 914. In this example, the EROE 900 may include a read-head 904, where the read-head 904 may include an emitter module 906, and a detector module 908. Similar to FIGS. 1, 2, 3, 6, 7, 8 and 9, the read-head 904 and the encoded media 902 may move freely relative to each other in either a linear or rotational manner based on whether the EROE 900 is either a linear or rotational optical encoder, respectively.

The emitter module 906 and the detector module 908 may include optics capable of emitting and detecting, respectively, optical radiation from the emitter module 906 to the detector module 908. The optical radiation may include emitted optical radiation 910, which is emitted by the emitter module 906 on to the encoded media 902, and reflected optical radiation 912, which is reflected to the detector module 908 by the encoded media 902. Additionally, both emitter module 906 and detector module 908 may be mounted on a common substrate 914. The common substrate 914 may be a single semiconductor substrate in an integrated circuit, a lead-frame, an insert-molded lead-frame, a PCB, flexible circuit, ceramics substrate or MID.

It is appreciated that the optical radiation may be visible, infrared, and/or ultraviolet light radiation. The emitting module 906 may include a light source (not shown) such as a diode, a LED, photo-cathode, and/or a light bulb, and the detector module 908 may include an array of photo-detectors (not shown) such as photo-diodes, photo-cathodes, and/or photo-multipliers.

The optics may include a first epoxy layer 916 capable of covering the emitter module 906 and a second epoxy layer 918 covering the detector module 908 where both the first epoxy layer 916 and second epoxy layer 918 may include any transparent and moldable material capable of collimating the emitted optical radiation 910 into a parallel beam of optical radiation directed from the emitter module 906 to the encoded media 902, and concentrating the reflected optical radiation 912 into a beam of optical radiation directed at the detector module 908, respectively.

Similar to the EROE 700 and EROE 800 of FIGS. 7 and 8, the EROE 900, FIG. 9, may include a transmissive layer trench 920 (such as an air-gap) between the first epoxy layer 916 and second epoxy layer 918. The transmissive layer trench 920 surfaces 922 may be tapered at an angle predetermined for ease of manufacturing. Unlike the EROE 700 of FIG. 7, the surfaces 922 of the EROE 900, FIG. 9, may be coated with black absorptive materials that absorb part of the undesired optical radiation 924 while the other part of the undesired optical radiation 926 is refracted away from the detector module 908. The black absorptive materials on the surfaces 922 further help reduce the noise caused by the undesired optical radiation 924 and 926 on the detector module 908. The black absorptive materials on the surfaces 922 may include any material that prevents the optical radiation 924 from passing through the material. Examples of the black absorptive materials may include a dummy black electronic component, an anodized metal, a separate piece of black plastic, black absorptive epoxy, black-polymer, carbon-filled polymer, black resin, black ink marks, coats of epoxy, and laser burned surfaces and other similar types of materials capable of absorbing optical radiation.

Again, the transmissive layer trench 920 may extend optionally to the substrate 914; however, it is also appreciated that the transmissive layer trench 920 also may not extend to the substrate 914. As an example, in FIG. 9, the transmissive layer trench 920 may include a trench bottom 928 that is substantially located on the substrate 914. It is also appreciated by those skilled in the art that if the trench bottom 928 is substantially located on the substrate 914, then the first epoxy layer 916 and second epoxy layer 918 may not be joined at the trench bottom 928 but may be joined elsewhere (not shown).

Figure 10:
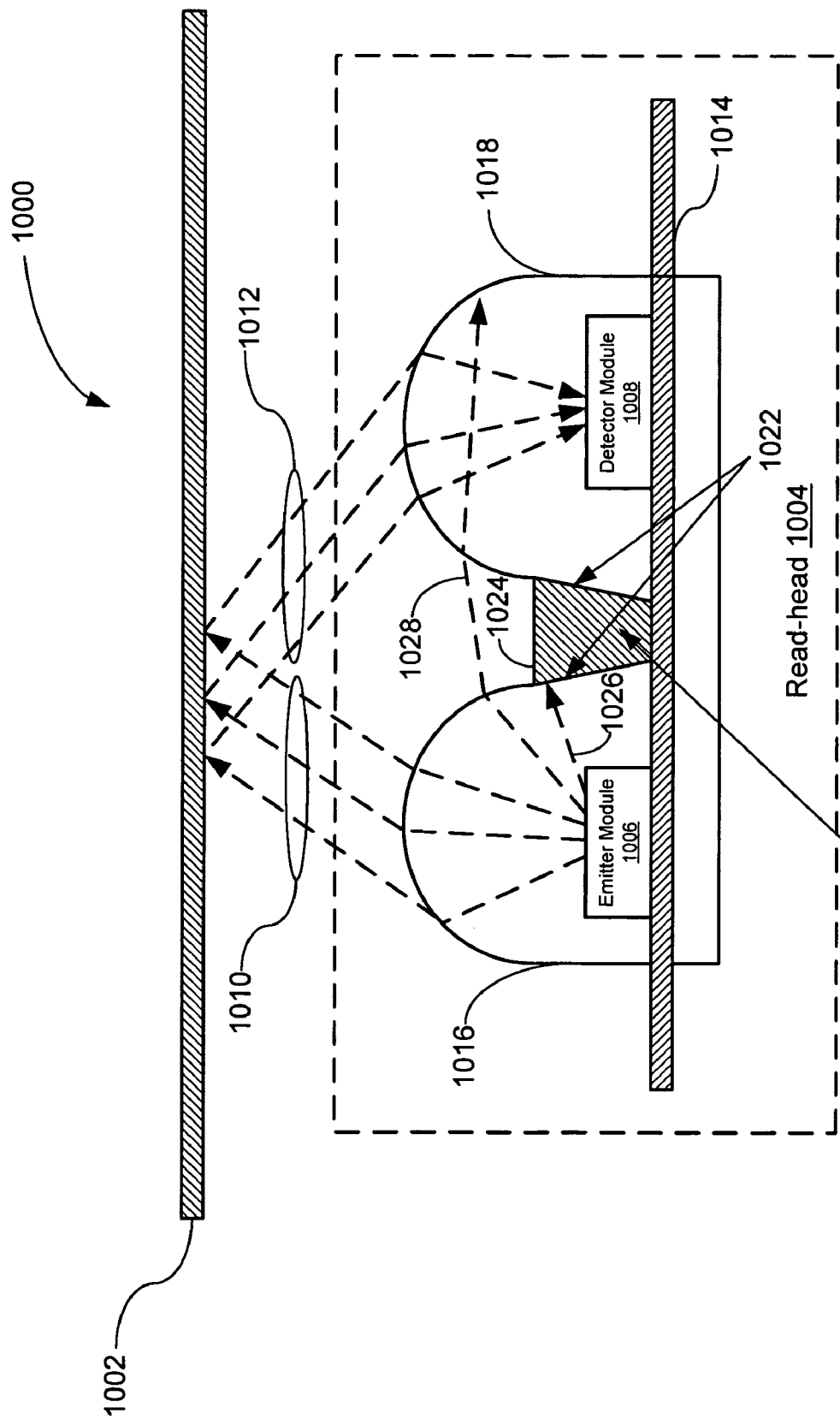
FIG. 10 shows a side cross-sectional view of still another example of an implementation of an EROE in combination with an encoded media.

In FIG. 10, a side cross-sectional view of still another example of an implementation of an EROE 1000 in combination with an encoded media 1002 is shown, where the optical isolation element is a transmissive layer trench 1020. In this example, the EROE 1000 may include a read-head 1004, where the read-head 1004 may include an emitter module 1006, and a detector module 1008. Similar to FIGS. 1, 2, 3, 6, 7, 8 and 9, the read-head 1004 and the encoded media 1002 may move freely relative to each other in either a linear or rotational manner based on whether the EROE 1000 is either a linear or rotational optical encoder, respectively.

The emitter module 1006 and the detector module 1008 may include optics capable of emitting and detecting, respectively, optical radiation from the emitter module 1006 to the detector module 1008. The optical radiation may include emitted optical radiation 1010, which is emitted by the emitter module 1006 on to the encoded media 1002, and reflected optical radiation 1012, which is reflected to the detector module 1008 by the encoded media 1002. Additionally, both emitter module 1006 and detector module 1008 may be mounted on a common substrate 1014. The common substrate 1014 may be a single semiconductor substrate in an integrated circuit, a lead-frame, an insert-molded lead-frame, a PCB, flexible circuit, ceramics substrate or MID.

The optical radiation may be visible, infrared, and/or ultraviolet light radiation. The emitting module 1006 may include a light source (not shown) such as a diode, a LED, photo-cathode, and/or a light bulb, and the detector module 1008 may include an array of photo-detectors (not shown) such as photo-diodes, photo-cathodes, and/or photo-multipliers.

The optics may include a first epoxy layer 1016 capable of covering the emitter module 1006 and a second epoxy layer 1018 covering the detector module 1008 where both the first epoxy layer 1016 and second epoxy layer 1018 may include any transparent and moldable material capable of collimating the emitted optical radiation 1010 into a parallel beam of optical radiation directed from the emitter module 1006 to the encoded media 1002, and concentrating the reflected optical radiation 1012 into a beam of optical radiation directed at the detector module 1008, respectively.

Similar to the EROE 900 of FIG. 9, the EROE 1000, FIG. 10, may include a transmissive layer trench 1020 (such as an air-gap) between the first epoxy layer 1016 and second epoxy layer 1018. The transmissive layer trench 1020 surfaces 1022 may be tapered at an angle predetermined for ease of manufacturing. Unlike the EROE 900 of FIG. 9, the surfaces 1022 of the EROE 1000, FIG. 10, may be filled with black absorptive materials 1024 that absorb part of the undesired optical radiation 1026 while the other part of the undesired optical radiation 1028 is refracted away from the detector module 1008. The black absorptive materials 1024 further help reduce the noise caused by the undesired optical radiation 1026 and 1028 on the detector module 1008. The black absorptive materials on the surfaces 1022 may include any material that prevents the optical radiation 1026 from passing through the material. Examples of the black absorptive materials may include a dummy black electronic component, an anodized metal, a separate piece of black plastic, black absorptive epoxy, black-polymer, carbon-filled polymer, black resin, black ink marks, coats of epoxy, and laser burned surfaces and other similar types of materials capable of absorbing optical radiation. Again, the transmissive layer trench 1020 may extend optionally to the substrate 1014; however, it is also appreciated that the transmissive layer trench 1020 also may not extend to the substrate 1014.

In FIG. 11, a side cross-sectional view of yet another example of an implementation of an EROE 1100 in combination with an encoded media 1102 is shown, where the optical isolation element is a top-surface 1120 that may be coated with a black absorptive material. In this example, the EROE 1100 may include a read-head 1104, where the read-head 1104 may include an emitter module 1106, and a detector module 1108. Similar to FIGS. 1, 2, 3, 6, 7, 8, 9 and 10, the read-head 1104 and the encoded media 1102 may move freely relative to each other in either a linear or rotational manner based on whether the EROE 1100 is either a linear or rotational optical encoder, respectively.

The emitter module 1106 and the detector module 1108 may include optics capable of emitting and detecting, respectively, optical radiation from the emitter module 1106 to the detector module 1108. The optical radiation may include emitted optical radiation 1110, which is emitted by the emitter module 1106 on to the encoded media 1102, and reflected optical radiation 1112, which is reflected to the detector module 1108 by the encoded media 1102. Additionally, both emitter module 1106 and detector module 1108 may be mounted on a common substrate 1114. The common substrate 1114 may be a single semiconductor substrate in an integrated circuit, a lead-frame, an insert-molded lead-frame, a PCB, flexible circuit, ceramics substrate or MID.

The optical radiation may be visible, infrared, and/or ultraviolet light radiation. The emitting module 1106 may include a light source (not shown) such as a diode, a LED, photo-cathode, and/or a light bulb, and the detector module 1108 may include an array of photo-detectors (not shown) such as photo-diodes, photo-cathodes, and/or photo-multipliers.

The optics may include a first epoxy layer 1116 capable of covering the emitter module 1106 and a second epoxy layer 1118 covering the detector module 1108 where both the first epoxy layer 1116 and second epoxy layer 1118 may include any transparent and moldable material capable of collimating the emitted optical radiation 1110 into a parallel beam of optical radiation directed from the emitter module 1106 to the encoded media 1102, and concentrating the reflected optical radiation 1112 into a beam of optical radiation directed at the detector module 1108, respectively.

The EROE 1100 may include a top-surface 1120 located between the first epoxy layer 1116 and second epoxy layer 1118. The top-surface 1120 may be coated with black absorptive materials that absorb part of the undesired optical radiation 1122 while the other part of the undesired optical radiation 1124 is refracted away from the detector module 1108. The top-surface 1120 further helps reduce the noise caused by the undesired optical radiation 1122 and 1124 on the detector module 1108. The black absorptive materials on the top-surface 1120 may include any material capable of absorbing the undesired optical radiation 1122. Examples of the black absorptive materials may include black-polymer, carbon-filled polymer, black resin, ink marks, coats of epoxy, or laser burned surfaces.

FIG. 12 shows a side cross-sectional view of another example of an implementation of an EROE 1200 in combination with an encoded media 1202, where the optical isolation element is a light baffle component 1220. In this example, the EROE 1200 may include a read-head 1204, where the read-head 1204 may include an emitter module 1206, and a detector module 1208. Similar to FIGS. 1, 2, 3, 6, 7, 8, 9, 10 and 11, the read-head 1204 and the encoded media 1202 may move freely relative to each other in either a linear or rotational manner based on whether the EROE 1200 is either a linear or rotational optical encoder, respectively.

The emitter module 1206 and the detector module 1208 may include optics capable of emitting and detecting, respectively, optical radiation from the emitter module 1206 to the detector module 1208. The optical radiation may include emitted optical radiation 1210, which is emitted by the emitter module 1206 on to the encoded media 1202, and reflected optical radiation 1212, which is reflected to the detector module 1208 by the encoded media 1202. Additionally, both emitter module 1206 and detector module 1208 may be mounted on a common substrate 1214. The common substrate 1214 may be a single semiconductor substrate in an integrated circuit, a lead-frame, an insert-molded lead-frame, a PCB, flexible circuit, ceramics substrate or MID.

The optical radiation may be visible, infrared, and/or ultraviolet light radiation. The emitting module 1206 may include a light source (not shown) such as a diode, a LED, photo-cathode, and/or a light bulb, and the detector module 1208 may include an array of photo-detectors (not shown) such as photo-diodes, photo-cathodes, and/or photo-multipliers.

The optics may include a first epoxy layer 1216 capable of covering the emitter module 1206 and a second epoxy layer 1218 covering the detector module 1208 where both the first epoxy layer 1216 and second epoxy layer 1218 may include any transparent and moldable material capable of collimating the emitted optical radiation 1210 into a parallel beam of optical radiation directed from the emitter module 1206 to the encoded media 1202, and concentrating the reflected optical radiation 1212 into a beam of optical radiation directed at the detector module 1208, respectively.

The EROE 1200 may include a light baffle component 1220 located between the first epoxy layer 1216 and second epoxy layer 1218. The light baffle component 1220 may be coated with black absorptive materials that absorb part of the undesired optical radiation 1222 while the other part of the undesired optical radiation 1224 is refracted away from the detector module 1208. The light baffle component 1220 further helps reduce the noise caused by the undesired optical radiation 1222 and 1224 on the detector module 1208. The light baffle component 1220 may be a rectangular shape. The black absorptive materials on the light baffle component 1220 may include black absorptive components such as a dummy black electronic component, an anodized metal, a separate piece of black plastic, black absorptive epoxy, black-polymer, carbon-filled polymer, black resin, black ink marks, coats of epoxy, laser burned surfaces and other similar types of materials capable of absorbing optical radiation.

In FIG. 13, a side cross-sectional view of another example of an implementation of an EROE 1300 in combination with an encoded media 1302 is shown, where the optical isolation element is a light baffle component 1320. In this example, the EROE 1300 may include a read-head 1304, where the read-head 1304 may include an emitter module 1306, and a detector module 1308. Similar to FIGS. 1, 2, 3, 6, 7, 8, 9, 10, 11 and 12, the read-head 1304 and the encoded media 1302 may move freely relative to each other in either a linear or rotational manner based on whether the EROE 1300 is either a linear or rotational optical encoder, respectively.

The emitter module 1306 and the detector module 1308 may include optics capable of emitting and detecting, respectively, optical radiation from the emitter module 1306 to the detector module 1308. The optical radiation may include emitted optical radiation 1310, which is emitted by the emitter module 1306 on to the encoded media 1302, and reflected optical radiation 1312, which is reflected to the detector module 1308 by the encoded media 1302. Additionally, both emitter module 1306 and detector module 1308 may be mounted on a common substrate 1314. The common substrate 1314 may be a single semiconductor substrate in an integrated circuit, a lead-frame, an insert-molded lead-frame, a PCB, flexible circuit, ceramics substrate or MID.

The optical radiation may be visible, infrared, and/or ultraviolet light radiation. The emitting module 1306 may include a light source (not shown) such as a diode, a LED, photo-cathode, and/or a light bulb, and the detector module 1308 may include an array of photo-detectors (not shown) such as photo-diodes, photo-cathodes, and/or photo-multipliers.

The optics may include a first epoxy layer 1316 capable of covering the emitter module 1306 and a second epoxy layer 1318 covering the detector module 1308 where both the first epoxy layer 1316 and second epoxy layer 1318 may include any transparent and moldable material capable of collimating the emitted optical radiation 1310 into a parallel beam of optical radiation directed from the emitter module 1306 to the encoded media 1302, and concentrating the reflected optical radiation 1312 into a beam of optical radiation directed at the detector module 1308, respectively.

Similar to the EROE 1200 of FIG. 12, the EROE 1300, FIG. 13, may include a light baffle component 1320 between the first epoxy layer 1316 and second epoxy layer 1318. The light baffle component 1320 may be coated with black absorptive materials that absorb part of the undesired optical radiation 1322 while the other part of the undesired optical radiation 1324 is refracted away from the detector module 1308. The light baffle component 1320 further helps reduce the noise caused by the undesired optical radiation 1322 and 1324 on the detector module 1308. The light baffle component 1320 may be a downward trapezoidal shape. The black absorptive materials on the light baffle component 1320 may include black absorptive components such as a dummy black electronic component, an anodized metal, a separate piece of black plastic, black absorptive epoxy, black-polymer, carbon-filled polymer, black resin, black ink marks, coats of epoxy, laser burned surfaces and other similar types of materials capable of absorbing optical radiation.

It is appreciated by those skilled in the art that the light baffle component 1320 may extend to the common substrate 1314, as shown in FIG. 13; however, it is also appreciated that the light baffle component 1320 may not extend to the common substrate 1314. It is also appreciated that the light baffle component 1320 may be created by first forming a trench as shown in FIG. 8 and filling the trench with the selected black absorptive component.

In FIG. 14, a side cross-sectional view of another example of an implementation of an EROE 1400 in combination with an encoded media 1402 is shown. In this example, the EROE 1400 may include a read-head 1404, where the read-head 1404 may include an emitter module 1406, and a detector module 1408. Similar to FIGS. 1, 2, 3, 6, 7, 8, 9, 10, 11, 12 and 13, the read-head 1404 and the encoded media 1402 may move freely relative to each other in either a linear or rotational manner based on whether the EROE 1400 is either a linear or rotational optical encoder, respectively.

The emitter module 1406 and the detector module 1408 may include optics capable of emitting and detecting, respectively, optical radiation from the emitter module 1406 to the detector module 1408. The optical radiation may include emitted optical radiation 1410, which is emitted by the emitter module 1406 on to the encoded media 1402, and reflected optical radiation 1412, which is reflected to the detector module 1408 by the encoded media 1402. Additionally, both emitter module 1406 and detector module 1408 may be mounted on a common substrate 1414. The common substrate 1414 may be a single semiconductor substrate in an integrated circuit, a lead-frame, an insert-molded lead-frame, a PCB, flexible circuit, ceramics substrate or MID.

The optical radiation may be visible, infrared, and/or ultraviolet light radiation. The emitting module 1406 may include a light source (not shown) such as a diode, a LED, photo-cathode, and/or a light bulb, and the detector module 1408 may include an array of photo-detectors (not shown) such as photo-diodes, photo-cathodes, and/or photo-multipliers.

The optics may include a first epoxy layer 1416 capable of covering the emitter module 1406 and a second epoxy layer 1418 covering the detector module 1408 where both the first epoxy layer 1416 and second epoxy layer 1418 may include any transparent and moldable material capable of collimating the emitted optical radiation 1410 into a parallel beam of optical radiation directed from the emitter module 1406 to the encoded media 1402, and concentrating the reflected optical radiation 1412 into a beam of optical radiation directed at the detector module 1408, respectively.

Similar to the EROE 1300 of FIG. 13, the EROE 1400, FIG. 14, may include a light baffle component 1420 between the first epoxy layer 1416 and second epoxy layer 1418. The light baffle component 1420 may be coated with black absorptive materials that absorb part of the undesired optical radiation 1422 while the other part of the undesired optical radiation 1424 is refracted away from the detector module 1408. The light baffle component 1420 further helps reduce the noise caused by the undesired optical radiation 1422 and 1424 on the detector module 1408. The light baffle component 1420 may be an upward trapezoidal shape. The black absorptive materials on the light baffle component 1420 may include black absorptive components such as a dummy black electronic component, an anodized metal, a separate piece of black plastic, black absorptive epoxy, black-polymer, carbon-filled polymer, black resin, black ink marks, coats of epoxy, laser burned surfaces and other similar types of materials capable of absorbing optical radiation.

It is appreciated by those skilled in the art that the light baffle component 1420 may extend to the common substrate 1414, as shown in FIG. 14; however, it is also appreciated that the light baffle component 1420 may not extend to the common substrate 1414. It is also appreciated that the light baffle component 1420 may be created by first forming a trench as shown in FIG. 8 and then filling the trench with the selected black absorptive component.

Figure 15:
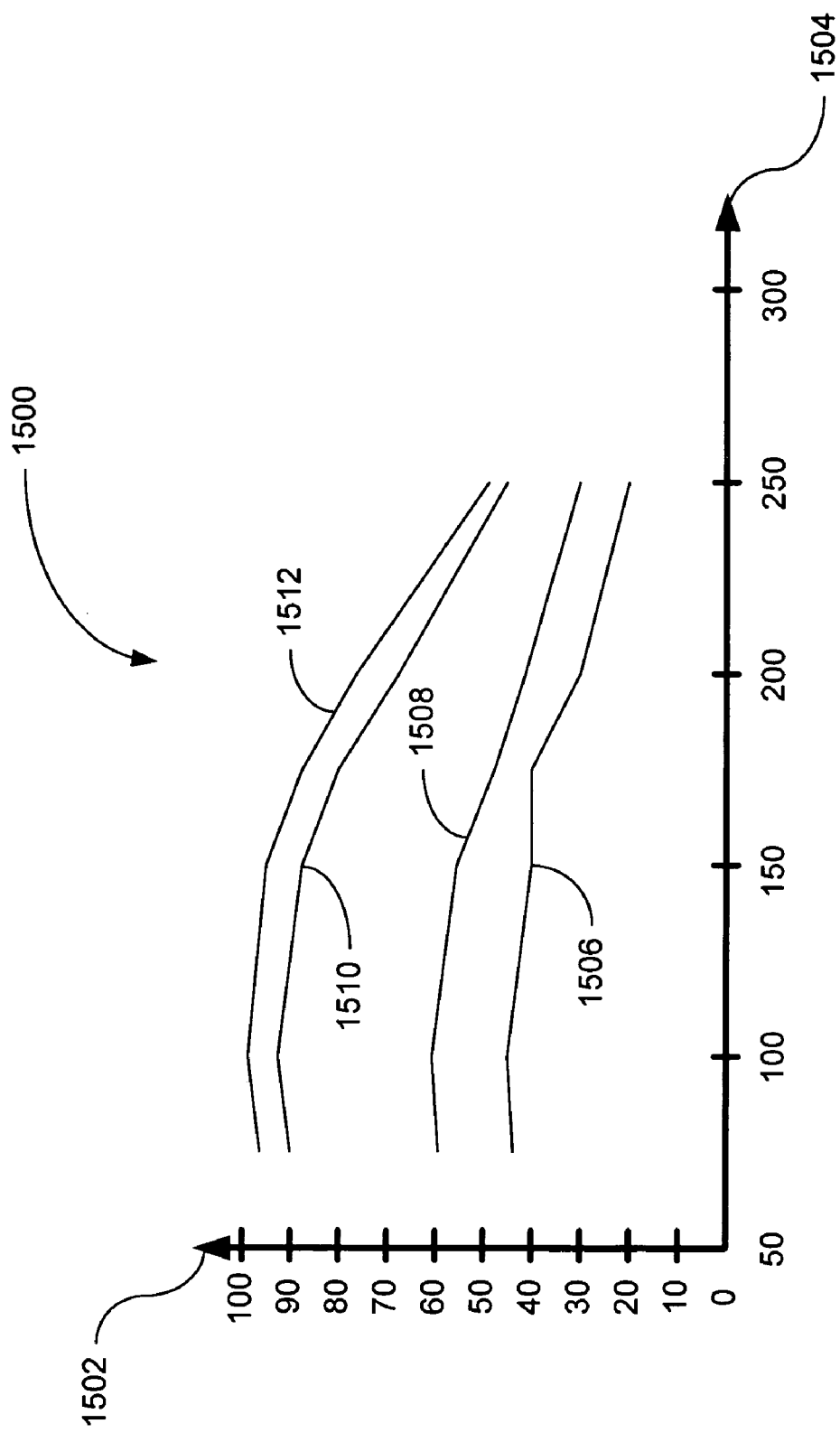
FIG. 15 shows a graphical representation of a plot of image contrast of the versus implementations of the EROE shown in FIGS. 7, 8, 9, 10, 11, 12, 13 and 14 versus code-bar resolution.

In FIG. 15, a graphical representation of a plot 1500 of image contrast 1502 of the various implementations of the EROE of FIGS. 6, 7, 10, and 11 versus code-bar resolution 1504 is shown. Plot curve 1506 shows the image contrast versus code-bar resolution of a typical known reflective optical encoder 600 shown in FIG. 6. Plot curve 1508 shows the image contrast versus code-bar resolution of the EROE 1000 utilizing a laser burned or ink marked top surface 1020 as shown in FIG. 10. Plot curve 1510 shows the image contrast versus code-bar resolution of the EROE 700 utilizing a transmissive layer trench 720 as shown in FIG. 7. Plot curve 1512 shows the image contrast versus code-bar resolution of the EROE 800 utilizing an transmissive layer trench 820 side-coated with black absorptive materials as shown in FIG. 8, the EROE 900 utilizing an transmissive layer trench 920 filled with black absorptive material as shown in FIG. 9, the EROE 1100 utilizing a light baffle 1120 as shown in FIG. 11, and the EROE 1200 utilizing a light baffle 1220 as shown in FIG. 12 and FIG. 14.

It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. An Enhanced Reflective Optical Encoder ("EROE") having an emitter module for transmitting emitted optical radiation to an encoded media and a detector module for receiving reflected optical radiation from the encoded media, wherein the reflected optical radiation is a portion of the emitted optical radiation that is reflected by the encoded media, the EROE comprising:
    a solid transmissive layer covering both the emitter module and the detector module; and
    an optical isolation element located within the transmissive layer and located between the emitter module and the detector module, wherein the optical isolation element reduces undesired optical radiation transmitted from the emitter module to the detector module, and the undesired optical radiation is a portion of the emitted optical radiation.

2. The EROE of claim 1, wherein the emitter module includes one or more light sources, wherein the one or more light sources are selected from the group consisting of diodes, light emitting diodes ("LEDs"), photo-cathodes, and a light bulb.

3. The EROE of claim 2, wherein the detector module includes one or more photo-detectors, wherein the one or more photo-detectors are selected from the group consisting of photo-diodes, photo-cathodes, and photo-multipliers.

4. The EROE of claim 1, wherein the transmissive layer is transparent.

5. The EROE of claim 4, wherein the transmissive layer includes colored epoxy.

6. The EROE of claim 4, wherein the transmissive layer includes black dye.

7. The EROE of claim 6, wherein the emitter module includes one or more infrared LEDs enabled to emit infrared light.

8. The EROE of claim 1, wherein the optical isolation element includes a transmissive layer trench having a trench bottom.

9. The EROE of claim 8, wherein the emitter module and detector module are located on a common substrate and the trench bottom is located substantially on the common substrate.

10. The EROE of claim 8, wherein the emitter module and detector module are located on a common substrate and the trench bottom is located above the common substrate.

11. The EROE of claim 8, wherein the transmissive layer trench has side walls coated with absorption material.

12. The EROE of claim 11, wherein the absorption material is selected from the group consisting of a dummy black electronic component, an anodized metal, a separate piece of black plastic, black absorptive epoxy, black-polymer, carbon-filled polymer, black resin, black ink marks, coats of epoxy, and laser burned surfaces.

13. The EROE of claim 8, where the transmissive layer trench is filled with absorption material.

14. The EROE of claim 13, wherein the absorption material is selected from the group consisting of a dummy black electronic component, an anodized metal, a separate piece of black plastic, black absorptive epoxy, black-polymer, carbon-filled polymer, black resin, black ink marks, coats of epoxy, and laser burned surfaces.

15. The EROE of claim 1, wherein the optical isolation element includes a light baffle component having a light baffle bottom and a light baffle top.

16. The EROE of claim 15, wherein the emitter module and detector module are located on a common substrate and the light baffle bottom is located on the common substrate.

17. The EROE of claim 15, wherein the light baffle component is trapezoidal in shape.

18. The EROE of claim 15, wherein the light baffle component includes an absorptive component selected from the group consisting of a dummy black electronic component, an anodized metal, a separate piece of black plastic, black absorptive epoxy, black-polymer, carbon-filled polymer, black resin, black ink marks, coats of epoxy, and laser burned surfaces.

19. An Enhanced Reflective Optical Encoder ("EROE") having an emitter module for transmitting emitted optical radiation to an encoded media and a detector module for receiving reflected optical radiation from the encoded media, wherein the reflected optical radiation is a portion of the emitted optical radiation that is reflected by the encoded media, the EROE comprising:

a transmissive layer covering both the emitter module and the detector module; and an optical isolation element located on top of the transmissive layer and located between the emitter module and the detector module, wherein the optical isolation element reduces undesired optical radiation transmitted from the emitter module to the detector module, and the undesired optical radiation is a portion of the emitted optical radiation.

20. The EROE of claim 19, wherein the optical isolation element is selected from the group consisting of a dummy black electronic component, an anodized metal, a separate piece of black plastic, black absorptive epoxy, black-polymer, carbon-filled polymer, black resin, black ink marks, coats of epoxy, and laser burned surfaces, wherein the emitter module includes one or more light sources, wherein the one or more light sources are selected from the group consisting of diodes, light emitting diodes ("LEDs"), photo-cathodes, and a light bulb, and wherein the detector module is selected from the group consisting of photo-detectors including photo-diodes, photo-cathodes, and photo-multipliers.

* * * * *